United States Patent
Bartling et al.

(10) Patent No.: US 12,517,806 B2
(45) Date of Patent: Jan. 6, 2026

(54) AUTOMATIC INJECTION OF WEAK CODE TO ATTRACT OR DISTRACT MALICIOUS ACTORS

(71) Applicant: Arm Limited, Cambridge (GB)

(72) Inventors: Michael Bartling, Austin, TX (US); Brendan James Moran, Coton (GB); Andreas Lars Sandberg, Cambridge (GB)

(73) Assignee: ARM LIMITED, Cambridge (GB)

( * ) Notice: Subject to any disclaimer, the term of this patent is extended or adjusted under 35 U.S.C. 154(b) by 276 days.

(21) Appl. No.: 18/106,666

(22) Filed: Feb. 7, 2023

(65) Prior Publication Data
US 2024/0264924 A1 Aug. 8, 2024

(51) Int. Cl.
G06F 9/44 (2018.01)
G06F 9/445 (2018.01)
G06F 9/45 (2006.01)
G06F 9/455 (2018.01)
G06F 11/3604 (2025.01)
G06F 11/3698 (2025.01)

(52) U.S. Cl.
CPC ...... *G06F 11/3612* (2013.01); *G06F 11/3698* (2025.01)

(58) Field of Classification Search
CPC ............. G06F 11/3612; G06F 11/3698; G06F 11/3644; G06F 21/566; G06F 21/577; G06F 21/54; G06F 21/55; H04L 63/1491
See application file for complete search history.

(56) References Cited

U.S. PATENT DOCUMENTS

| | | | |
|---|---|---|---|
| 12,050,668 B1 * | 7/2024 | Soofi | G06F 21/14 |
| 12,079,345 B2 * | 9/2024 | Stolfo | H04L 63/1425 |
| 2018/0211046 A1 * | 7/2018 | Muttik | G06F 21/566 |
| 2019/0068640 A1 | 2/2019 | Araujo et al. | |

(Continued)

FOREIGN PATENT DOCUMENTS

PT 106777 B * 8/2015

OTHER PUBLICATIONS

Chunbai Yang, OPE: Transforming Programs with Clean and Precise Separation of Tested Intraprocedural Program Paths with Path Profiling, 2021, pp. 1-12. https://ieeexplore.ieee.org/stamp/stamp.jsp?tp=&arnumber=9724849 (Year: 2021).*

(Continued)

*Primary Examiner* — Mongbao Nguyen
(74) *Attorney, Agent, or Firm* — Talem IP Law, LLP (57) ABSTRACT

A computer implemented method is provided. The computer implemented method includes receiving an intermediate representation of a source code, intentionally injecting a weak code path at a point within the intermediate representation to create a modified intermediate representation, performing a path profiling on the modified intermediate representation to generate a particular path identifier for each path within the modified intermediate representation, and identifying the particular path identifier of the weak code path for use by a monitoring system. A monitoring system is also provided. The monitoring system monitors an executable code during runtime for execution of a path having a particular path identifier corresponding to the injected intentionally weak code path.

17 Claims, 7 Drawing Sheets

(56) References Cited

U.S. PATENT DOCUMENTS

| | | | |
|---|---|---|---|
| 2020/0057856 A1* | 2/2020 | Daymont | G06F 11/3612 |
| 2020/0125475 A1* | 4/2020 | Iyer | G06F 8/75 |
| 2021/0064352 A1* | 3/2021 | Drepper | G06F 8/4435 |
| 2023/0133651 A1* | 5/2023 | Wildsmith | G06F 21/563 |
| | | | 726/24 |
| 2023/0140432 A1* | 5/2023 | Wildsmith | G06F 21/14 |
| | | | 726/22 |
| 2024/0045956 A1* | 2/2024 | Fire | G06F 21/563 |
| 2024/0054227 A1* | 2/2024 | Dahmen | G06F 21/566 |

OTHER PUBLICATIONS

English Translation, Escravana (PT 106777 B), 2015, pp. 1-12. (Year: 2015).*

Julien Lancia, Detecting fault injection vulnerabilities in binaries with symbolic execution, 2022, pp. 1-8. https://ieeexplore.ieee.org/stamp/stamp.jsp?tp=&arnumber=9847500 (Year: 2022).*

Combined Search and Examination Report under Sections 17 and 18(3) issued in United Kingdom Application No. 2400954.0, mailed Jul. 25, 2024, 6 pages.

Crane, Stephen, et al., "Booby Trapping Software," Proceedings of the 2013 New Security Paradigms Workshop, Dec. 2013 (Accessible: Sep. 9, 2013), pp. 95-105, ACM.

\* cited by examiner

AUTOMATIC INJECTION OF WEAK CODE TO ATTRACT OR DISTRACT MALICIOUS ACTORS

BACKGROUND

With the ubiquitousness of software, computers, and networked environments, malicious actors have many ways to access confidential information and interfere with devices. Constantly reacting to emerging attack vectors (e.g., as part of cybersecurity) can be a drain on resources; however, proactively addressing software security is a difficult proposition and still prone to human error. Indeed, it can be challenging to monitor all systems and code. One approach to cybersecurity is to set up a system, device, or section of code as attractive as possible so that it will be more likely to be the focus of an attack. This bait is commonly referred to as a honeypot.

Traditionally, honeypots try to bait attackers into exploiting intentionally broken software systems on isolated machines which are configured to monitor attacks as they operate. Sometimes, though, honeypots go a bit further by incorporating an alerting mechanism which may trigger a termination of the system function, in order to prevent any damage from occurring, as soon as malware writes to specific illegal addresses or performs a specific illegal sequence of operations.

BRIEF SUMMARY

Methods and systems to automatically and intentionally inject weak code to attract or distract malicious actors are described.

A computer implemented method includes receiving an intermediate representation of a source code, injecting an intentionally weak code path at a point within the intermediate representation to create a modified intermediate representation, performing a path profiling on the modified intermediate representation to generate a particular path identifier for each path within the modified intermediate representation, and identifying the particular path identifier of the weak code path for use by a monitoring system.

A computer-readable storage medium having instructions stored thereon that when executed perform a method. The method includes: receiving, at a monitoring system, a mapping of the injected intentionally weak code path in an executable code to a particular path identifier corresponding to the injected weak code path, during runtime of the executable code, monitoring, by the monitoring system, the executable code for execution of a path having the particular path identifier corresponding to the injected intentionally weak code path, and responsive to determining that the injected intentionally weak code path is executed, generating, by the monitoring system, a notification that the intentionally weak code path has been accessed.

A computing system includes a processor, a storage system, and instructions for a program associated with an integrated development environment stored on the storage system that when executed by the processor, direct the computing system to receive an intermediate representation of a source code, inject an intentionally weak code path at a point within the intermediate representation to create a modified intermediate representation, perform a path profiling on the modified intermediate representation to generate a particular path identifier for each path within the modified intermediate representation, and identify the particular path identifier of the weak code path for use in a monitoring system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Methods and systems to automatically inject weak code to attract or distract malicious actors are described. Weak code is a piece of code that can lead to a vulnerability such that it could be exploited by a malicious actor, or as commonly referred to, an attacker. For example, weak code may include a branch that never gets executed, e.g., dead code, or branch that, in practice, should never happen unless an attacker is dedicated to entering that branch to exploit the code. As an example: If a user inputs "up up down down left right left right B A START SELECT" then branch to dead code. In practice this should never happen unless an attacker is determined to enter the weak code. Through certain implementations of the systems and methods described herein, intentional weaknesses or vulnerabilities can be injected into existing code in an attempt to lure malicious actors without sacrificing software integrity and in a manner that keeps the weak code from being readily identified as not part of the intended executable code.

Figure 1:
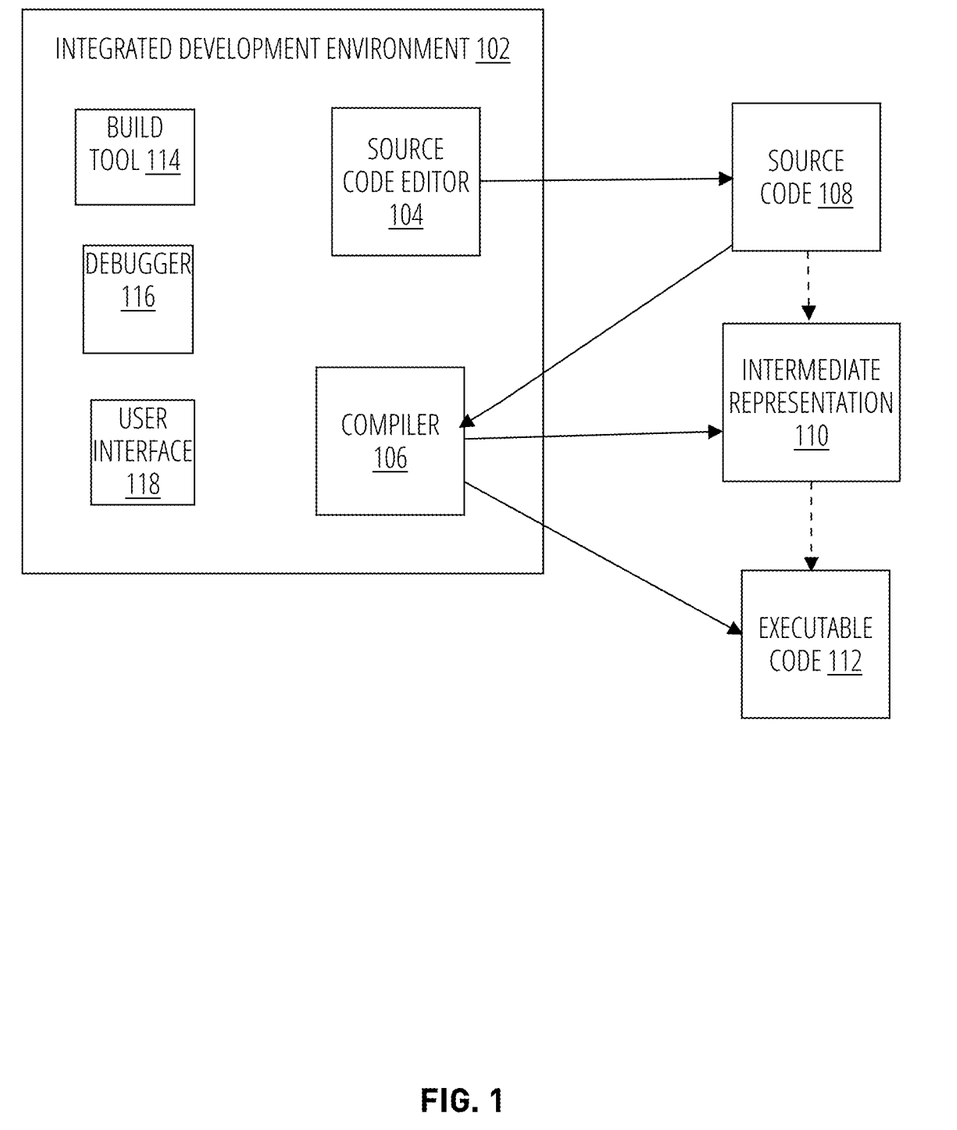
FIG. 1 illustrates a schematic diagram of an integrated development environment and the stages of code generated.

FIG. 1 illustrates a schematic diagram of an Integrated Development Environment (IDE) and the stages of code generated. An Integrated Development Environment 102 is a tool used by software developers to efficiently develop a code or program. For example, the IDE 102 may include a source code editor 104, enabling a developer to write and edit source code 108. In some cases, the IDE can be a continuous development scenario where software builds, modifications, and conformance occurs in a secure environment that can be located in the cloud. The source code 108 can be a production application code, for example. The IDE 102 may also include a compiler 106 that translates the source code 108 from a high-level programming language to a lower-level language.

More specifically, the compiler 106 may receive the source code 108 and translate it to an intermediate representation 110 in a first stage of compilation. Simply put, an intermediate representation (IR) is any representation of a program between the source code and the target, or executable, code. The compiler 106 uses the intermediate representation 110 to represent the source code 108. In an embodiment, the intermediate representation 110 is a control flow graph showing the paths of the program using graph notation. From the intermediate representation 110, the compiler 106 generates the executable code 112 in a later stage of compilation.

The IDE 102 may also include a build tool 114 to facilitate the generation of a 'software build', a debugger 116 enabled to run the executable code 112 under controlled conditions that permit monitoring and tracking of the execution progress, and a user interface 118 that allows a user to interact with modules of the IDE 102. Implementations of the described automatic injection of weak code can be incorporated into the IDE 102 and/or compiler 106 of the IDE 102, as described with respect to trusted compiler 204 of FIG. 2.

Figure 2:
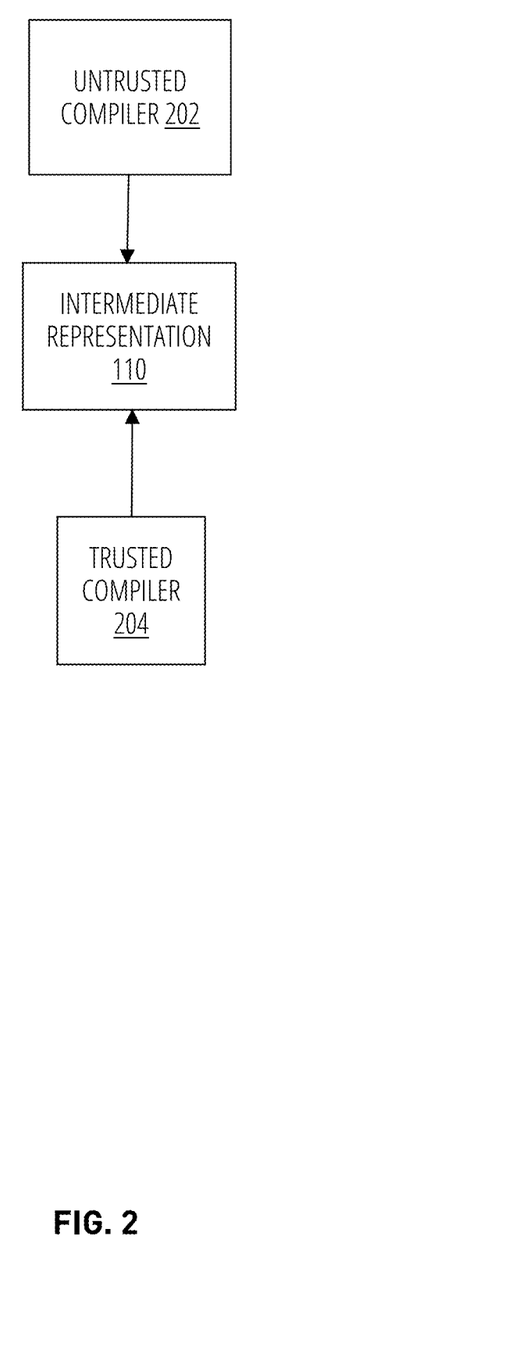
FIG. 2 illustrates a schematic diagram of entities with access to the intermediate representation.

FIG. 2 illustrates a schematic diagram of entities with access to the intermediate representation 110. A trusted compiler 204 is the compiler that is responsible to ship the code to a third party and has access to the secure elements of the code. An untrusted compiler 202, perhaps used by an attacker, can have access to the intermediate representation 110 of the code from an open source model, for example, but does not have access to the secure elements of the code. The attacker may then, having access to the intermediate representation 110, attempt to exploit the code. The attacker can do this, for example, by lifting the code into a higher, more understandable form and then notice the region of weak code. During runtime, the attacker attempts to exploit the vulnerable weak code to branch to their malicious code.

At a trusted compiler 204, intentionally weak code is injected within an intermediate representation to lure and confuse attackers, as a software honeypot, so that the attackers cannot distinguish between a real coding weakness and the injected weak code. A method to inject intentional weaknesses and/or vulnerabilities in existing code in an attempt to lure an attacker without sacrificing the integrity of the software is presented that can be carried out by a computing system supporting a trusted compiler 204.

Figure 3:
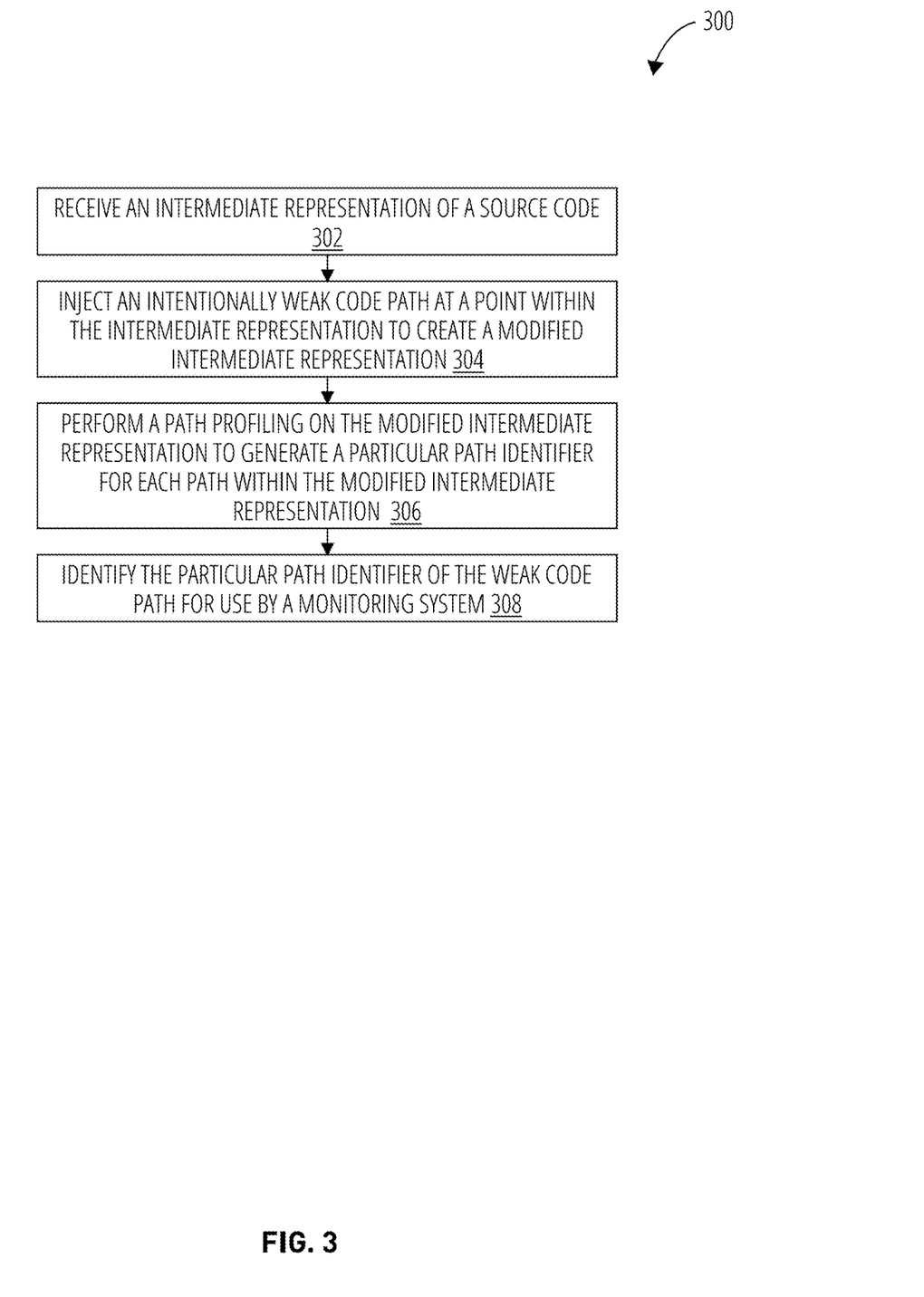
FIG. 3 illustrates a method of injecting a weak code path in accordance with one embodiment.

FIG. 3 illustrates a method of injecting a weak code path in accordance with one embodiment. Method 300 can be performed by a computing system supporting a trusted compiler 204 such as described with respect to FIG. 2 and which can include the features described with respect to IDE 102 of FIG. 1. Referring to FIG. 3, the method includes, at block 302, receiving an intermediate representation of a source code. The method 300 further includes, at block 304, injecting an intentionally weak code path at a point within the intermediate representation to create a modified intermediate representation, performing, at block 306 a path profiling on the modified intermediate representation to generate a particular path identifier for each path within the modified intermediate representation, identifying, at block 308, the particular path identifier of the weak code path for use by a monitoring system.

For example, an IDE 102 implemented as a trusted compiler 204, takes in as input (e.g., in operation 302), the intermediate representation 110 of the source code 108 and outputs a modified intermediate representation of the source code with weak code path(s) injected (e.g., after performing operations 304-310). The code of the method 300 can be a separate software program running separately from the trusted compiler 204 taking in the compiled intermediate representation 110 from the trusted compiler 204 or the method code can be directly integrated into the trusted compiler 204. In an embodiment, the trusted compiler 204 automatically performs the method during the first stage of compilation after it creates the intermediate representation 110 from the source code 108.

In an embodiment, the method (e.g., method 300) intentionally injects multiple weak code paths each at a point within the intermediate representation 110. Each weak code path is a fixed preset structure of weak code that can be generic weak code, written custom weak code, or weak code that is obtained from a third party. Dead code, or code that under normal operating conditions should never get executed, may be inserted around the weak code path. This is done to provide a guard rail to a trusted user so that when running the executable code 112, under normal circumstances, the program doesn't operate as unintended, e.g., malfunction. The dead code can, for example, include a reference to a global variable or makes a reference to a function parameter.

In an embodiment, each weak code path may be injected at an unpredictable or deterministic point within the intermediate representation 110. For example, there can be heuristic approaches, machine learning (ML) approaches, or even a random approach, for selecting where to inject the weak code. In some cases, it can be specified that weak code should not be injected into single instruction, multiple data (SIMD) or vector code because that would limit performance or that the weak code should be injected immediately after a function entry. In other cases, a user can have an option to explicitly exclude weak code from a function, designated area of code, or even an entire call tree. Alternately, the method can take in as input an injection specification from a user, specifying points within the intermediate representation 110 where the weak code injection(s) should take place.

The method 300 includes code to perform a path profiling on the intermediate representation 110 with the injected weak code paths. Path profiling algorithms count how often each path through a function or program is taken at runtime. The path profiling can be performed from a control flow graph of the intermediate representation 110 using the Ball and Larus path profiling algorithm, for example. The Ball and Larus method of path profiling takes in the control flow graph and for any arbitrary path in the control flow graph, gives as an output a particular path identifier, or path ID. Additionally, the Ball and Larus algorithm can determine the frequency of each control flow path in the program.

In some cases, the particular path identifier can be a unique path identifier. For example, the particular path identifier can be unique if a single path involves executing the single program counter value or range of program counter values or instruction waypoints. In other cases, the particular path identifier can be an alternative path identifier such as a single program counter value, a range of program counter values that constitute the injected weakness, or one or more instruction waypoints. For example, if multiple paths of interest all involve executing a particular instruction, at least one instruction out of range, or traverse a sequence a sequence of waypoints, then the particular path identifier is not a unique path identifier. The particular path identifiers are chosen such that an attacker cannot distinguish intentionally weak code from weak code, in general.

Figure 4:
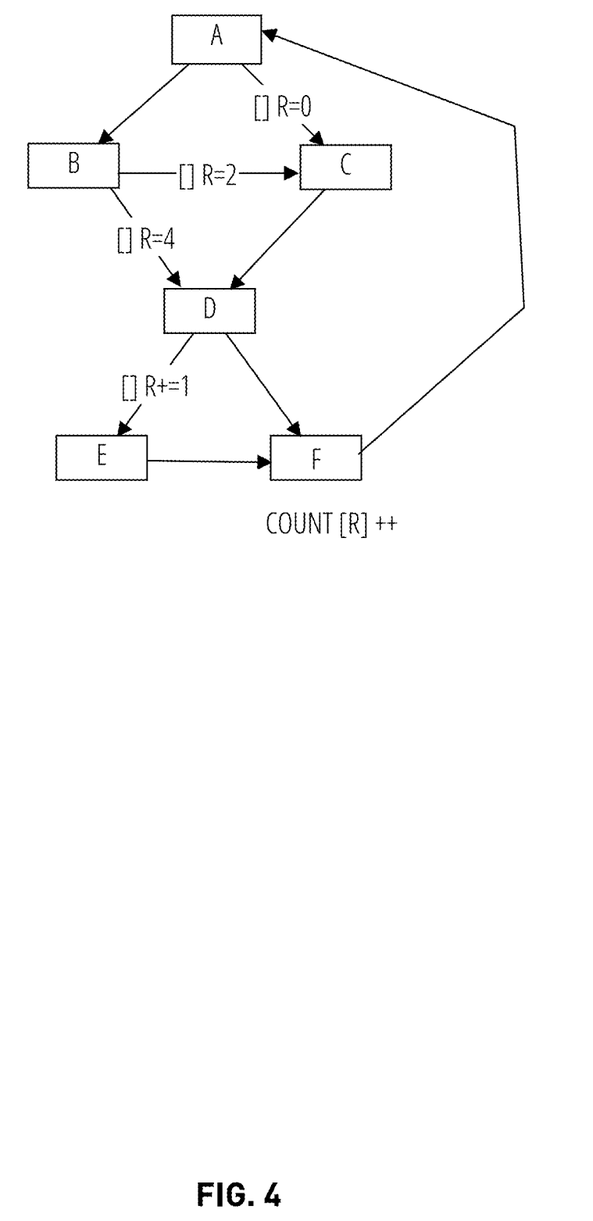
FIG. 4 illustrates a control flow graph illustrating a classic example of the Ball and Larus algorithm.

FIG. 4 shows a control flow graph illustrating a classic example of the Ball and Larus algorithm. Edges in the control graph are represented by a square [ ]. The edges contain instrumentation, which updates the state in register R. Each path from A to F produces a unique state in register R, which indexes an array of counters in F. The illustrated loop shows six particular paths, and each one computes a different value for R. At the end of the loop body (block F), register R holds the index to increment an array of counters. The Ball and Larus algorithm, thus, can be utilized to produce a particular path identification for each arbitrary path within the control flow graph.

The method 300 includes code to identify the particular path identifier of each weak code path. This can be accomplished by marking each weak code path within the code, e.g., by assigning an attribute to the weak code path, prior to the path profiling and then creating a mapping of each weak code path to its corresponding particular path identifier. The mapping is securely stored, e.g., not accessible to untrusted compilers 202, in a secure environment.

Figure 5:
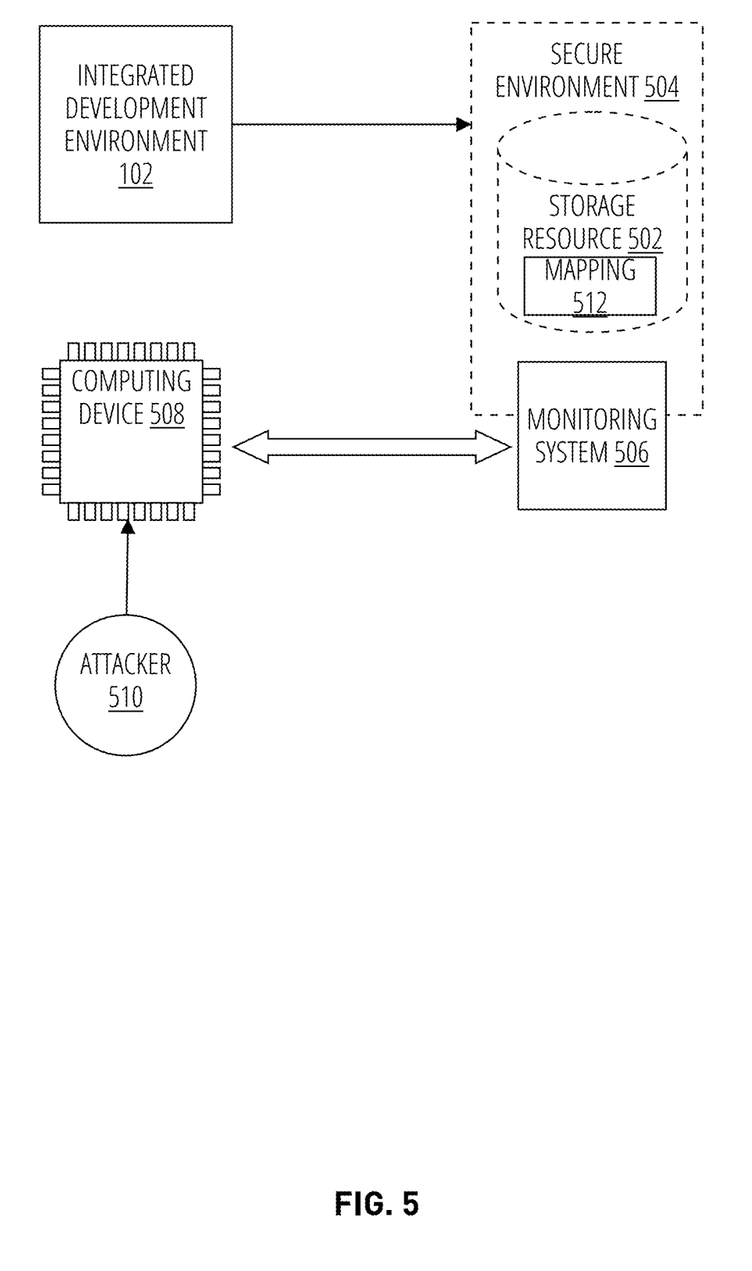
FIG. 5 illustrates an operating environment for protection against malicious actors.

FIG. 5 illustrates an operating environment for protection against malicious actors. Referring to FIG. 5, after a program is compiled (e.g., at IDE 102) with the injected weak code path and the identified particular path identifiers stored in secure environment 504 (e.g., mapping 512 in storage resource 502), the program (e.g., as executable code 112 of FIG. 1) can be deployed or otherwise provided to a computing device 508 for normal execution.

A monitoring system 506 can monitor activity on the computing device 508 with respect to executing the program. The monitoring system 506 can be associated with or have access to the storage resource 502 and a secure environment 504. The secure environment 504 may be a data center such as a cloud data center and may include specialized hardware such as a hardware security module (HSM). Monitoring system 506 includes a software program that runs in the secure environment 504.

Monitoring system 506 can monitor executable code 112 running on computing device 508 during runtime to identify whether the particular path identifiers of the injected weak code paths have been or are being executed. The monitoring system 506 uses the mapping 512 stored in storage resource 502 to monitor executable code for the particular path identifiers of the injected weak code to be executed. In order to keep the mapping 512 secure, e.g., inaccessible to the attacker 510, the monitoring system 506 runs in the secure environment 504. In an embodiment, when the particular path identifiers are executed by the monitored executable code running on the computing device 508, the monitoring system 506 generates a notification that the weak code has been accessed. The notification can then be sent to another application to be stored or used by the application to perform a mitigation.

As briefly mentioned above, the Integrated Development Environment 102 of FIG. 1, when implemented as a trusted compiler 204 of FIG. 2, can be used to perform the method (e.g., method 300) to inject one or more weak code paths, into an intermediate representation 110 of a source code 108.

Figure 6:
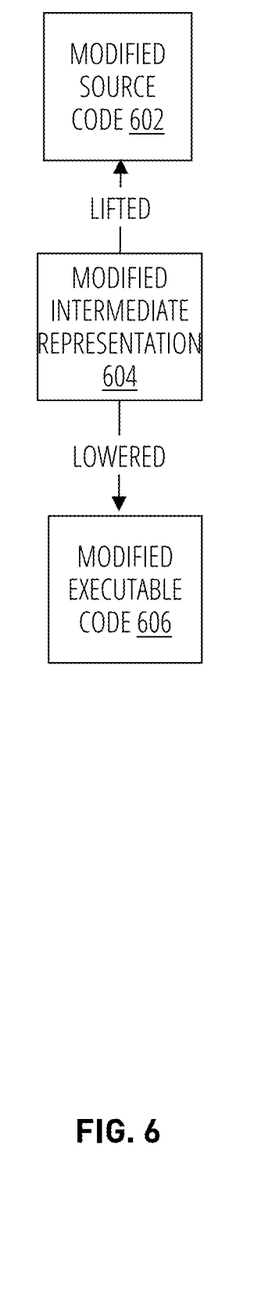
FIG. 6 illustrates a schematic diagram of the stages of code of a modified intermediate representation being lifted or lowered.

FIG. 6 illustrates a schematic diagram of the stages of code of a modified intermediate representation being lifted or lowered. In some cases, the modified intermediate representation 604 of the source code 108 can be used to go backwards and create a modified source code 602. In other words, the modified intermediate representation 604 can be 'lifted' into a higher-level representation such as source code. Lifting the modified intermediate representation into source code may be beneficial to a defender, such as a trusted user, in order to obfuscate the program containing the weak code paths to untrusted entities such as an untrusted compiler 202 or an attacker 510. For example, an attacker 510 could potentially download the modified source code 602 from an open file sharing source on computing device 508. Once downloaded to the computing device 508, it will be difficult for the attacker 510 to distinguish between 'normal' code and the injected weak code paths. Alternately or additionally, the trusted compiler 204 can compile the modified intermediate representation 604 in a later stage of compilation, e.g., 'lowering' the code, to create a lower level representation such as a modified executable code 606. The modified executable code 606 may be run by other entities, such as attacker 510, on computing device 508.

Figure 7:
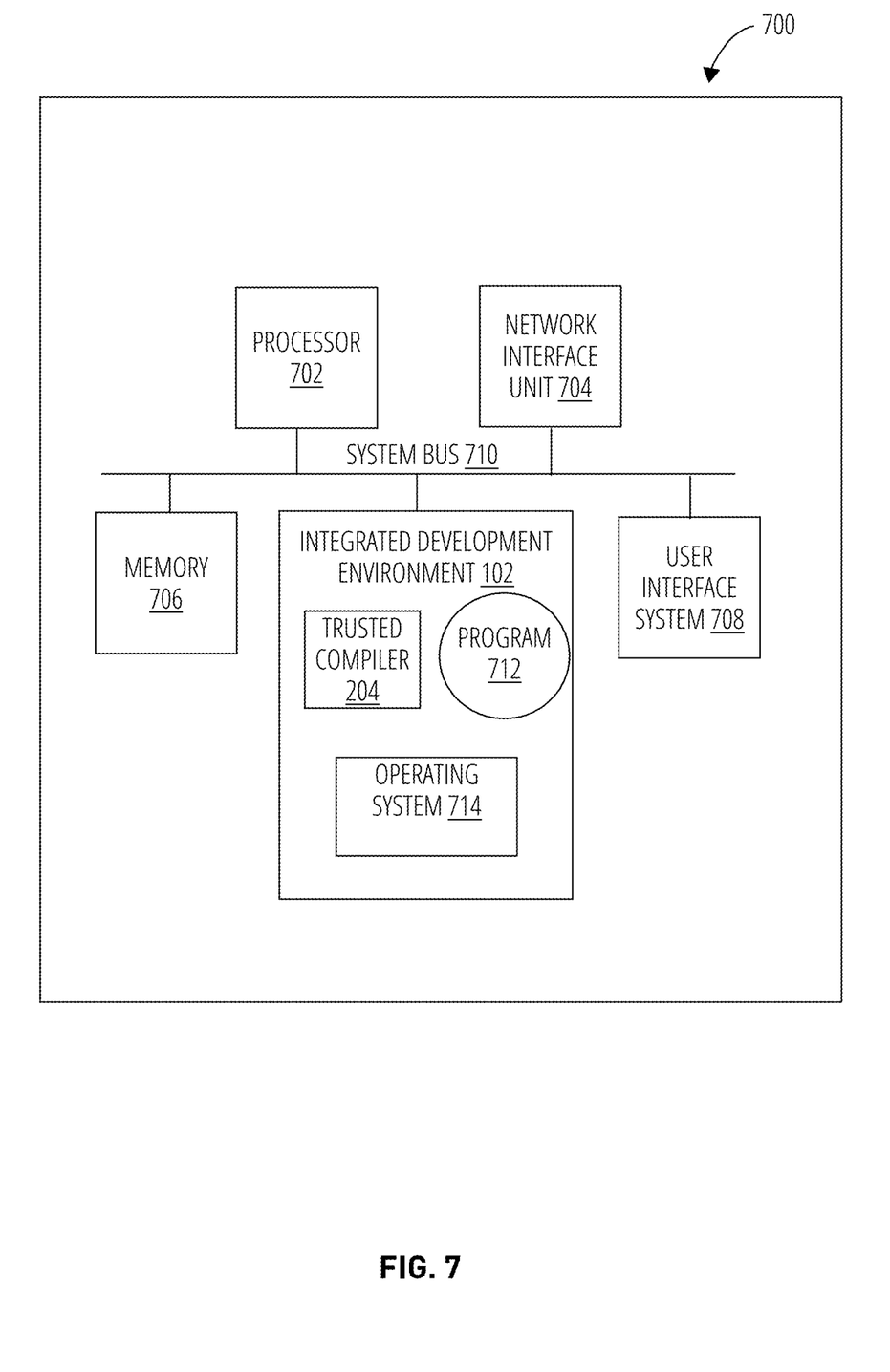
FIG. 7 illustrates a schematic diagram illustrating components of a computing system.

FIG. 7 illustrates a schematic diagram illustrating components of a computing system. It should be understood that aspects of the system described herein are applicable to both mobile and traditional desktop computers, as well as server computers and other computer systems. Components of computing system 700 may represent a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen as some examples. Accordingly, more or fewer elements described with respect to computing system 700 may be incorporated to implement a particular computing system.

Referring to FIG. 7, a computing system 700 can include at least one processor 702 connected to components via a system bus 710, a memory 706, and an Integrated Development Environment 102. A processor 702 processes data according to instructions of a program 712, trusted compiler 204 as referenced in FIG. 2, and/or operating system 714. The program 712 may be loaded into the Integrated Development Environment 102 and run on or in association with the operating system 714. Program 712 712 may include the method 300 as described. The computing system 700 can further include a user interface system 708, which may include input/output (I/O) devices and components that enable communication between a user and the computing system 700. Computing system 700 may also include a network interface unit 704 that allows the system to communicate with other computing devices, including server computing devices and other client devices, over a network.

As illustrated by the various examples and scenarios herein, it can be seen that in operation, once downloaded, a software program containing the injected weak code paths, according to the proposed method, will be obfuscated to an attacker such that the attacker has difficulty distinguishing between real exploitable code and the injected weak code paths as all paths within the code are 'instrumented'. Furthermore, a trusted entity, or defender, has the ability to record, using the mapping, all of the weak code paths of the weak code which can help secure the other the code.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:
1. A computer implemented method, comprising:
 compiling by a computing system a source code into an intermediate representation stored in a computer storage medium;

receiving by the computing system the intermediate representation of the source code stored in the computer storage medium;

injecting by the computing system an intentionally weak code and an associated intentionally weak code path at a point within the intermediate representation to create a modified intermediate representation stored in the computer storage medium, wherein injecting the intentionally weak code and the associated intentionally weak code path comprises injecting dead code inhibits the intentionally weak code path from being taken during normal execution of a code described by the modified intermediate representation, wherein the dead code includes a reference to a global variable or makes a reference to a function parameter;

executing, via a processor of the computing system, instructions of a path profiling algorithm to perform a path profiling on the modified intermediate representation to generate a particular path identifier for each path within the modified intermediate representation; and identifying by the computing system the particular path identifier of the intentionally weak code path for use by a monitoring system.

2. The method of claim 1, wherein the weak code path is injected at an unpredictable point within the intermediate representation.

3. The method of claim 1, wherein the weak code path is injected at a user specified point within the intermediate representation.

4. The method of claim 1, wherein the weak code path is injected at a deterministic point within the intermediate representation.

5. The method of claim 1, wherein the weak code path is injected at a random point within the intermediate representation.

6. The method of claim 1, wherein the method is performed automatically by a trusted compiler during a first stage of compilation.

7. The method of claim 1, wherein the path profiling is performed using a Ball and Larus algorithm.

8. The method of claim 1, wherein identifying the particular path identifier includes creating a mapping of the weak code path to the particular path identifier corresponding to the weak code path.

9. The method of claim 1, further comprising compiling the modified intermediate representation by a trusted compiler to create an executable code.

10. The method of claim 1, further comprising creating a modified source code from the modified intermediate representation.

11. A computing system, comprising:
a processor;
a storage system comprising a computer-readable storage medium; and
instructions for a program associated with an integrated development environment stored on the storage system when executed by the processor, direct the computing system to:
compile a source code into an intermediate representation stored in the computer-readable storage medium;
receive the intermediate representation of the source code stored in the computer-readable storage medium;
inject an intentionally weak code and an associated intentionally weak code path at a point within the intermediate representation to create a modified intermediate representation stored in the computer-readable storage medium, wherein injecting the intentionally weak code and the associated intentionally weak code path comprises injecting dead code inhibits the intentionally weak code path from being taken during normal execution of a code described by the modified intermediate representation, wherein the dead code includes a reference to a global variable or makes a reference to a function parameter;
execute at least a portion of the instructions of a path profiling algorithm to perform a path profiling on the modified intermediate representation to generate a particular path identifier for each path within the modified intermediate representation; and
identify the particular path identifier of the weak code path for use in a monitoring system.

12. The computing system of claim 11, wherein the weak code path is injected at an unpredictable point within the intermediate representation.

13. The computing system of claim 11, wherein the weak code path is injected at a user specified point within the intermediate representation.

14. The computing system of claim 11, wherein the path profiling is performed using a Ball and Larus algorithm.

15. A computer implemented method, comprising:
receiving an intermediate representation of a source code stored in a computer storage medium;
injecting an intentionally weak code and an associated intentionally weak code path at a point within the intermediate representation to create a modified intermediate representation stored in the computer storage medium, wherein injecting the intentionally weak code and the associated intentionally weak code path comprises injecting dead code inhibits the intentionally weak code path from being taken during normal execution of a code described by the modified intermediate representation, wherein the dead code includes a reference to a global variable or makes a reference to a function parameter;
executing, via a processor, instructions of a path profiling algorithm to perform a path profiling on the modified intermediate representation to generate a particular path identifier for each path within the modified intermediate representation;
identifying the particular path identifier of the intentionally weak code path for use by a monitoring system; and
monitoring executable code during runtime via the monitoring system to determine whether the particular path identifier of the intentionally weak code path has been or is being executed, where execution of the particular path identifier indicates to the monitoring system weak code of the weak code path has been accessed during runtime.

16. The method of claim 15, further comprising:
responsive to determining by the monitoring system the particular path identifiers are executed during runtime, generating by the monitoring system a notification the weak code has been accessed.

17. The method of claim 15, wherein the monitoring system comprises a software program runs in a secure environment, wherein the software program performs monitoring during runtime.

* * * * *